Dec. 8, 1942.    L. O. CARLSEN    2,304,148
STOCK DIVIDING GAUGE
Filed Nov. 13, 1940    4 Sheets-Sheet 1

INVENTOR
LEONARD O. CARLSEN
BY
ATTORNEY

Dec. 8, 1942. L. O. CARLSEN 2,304,148
STOCK DIVIDING GAUGE
Filed Nov. 13, 1940 4 Sheets-Sheet 2

INVENTOR
LEONARD O. CARLSEN
BY
ATTORNEY

Dec. 8, 1942.   L. O. CARLSEN   2,304,148
STOCK DIVIDING GAUGE
Filed Nov. 13, 1940   4 Sheets-Sheet 3

INVENTOR
LEONARD O. CARLSEN
BY
ATTORNEY

Dec. 8, 1942.　　　L. O. CARLSEN　　　2,304,148
STOCK DIVIDING GAUGE
Filed Nov. 13, 1940　　　4 Sheets-Sheet 4

Inventor
LEONARD O. CARLSEN
By
Attorney

Patented Dec. 8, 1942

2,304,148

UNITED STATES PATENT OFFICE 2,304,148

STOCK DIVIDING GAUGE

Leonard O. Carlsen, Rochester, N. Y., assignor to Gleason Works, Rochester, N. Y., a corporation of New York Application November 13, 1940, Serial No. 365,545

16 Claims. (Cl. 90—1)

The subject of the present invention is a stock-dividing mechanism for gear cutting machines and particularly a stock dividing mechanism for straight tooth bevel gear generators. The present application is a continuation in part of my pending application Serial No. 300,025, filed October 18, 1939.

Before finish-cutting a gear on a gear cutting machine, it is necessary to position the previously roughed gear blank accurately with reference to the cutting tool or tools so that, in the finish-cutting operation, the tool or tools will remove the correct amounts of stock from the roughed teeth to obtain the desired finished tooth size. For thus positioning the roughed gear blank, it is customary to employ a so-called stock-dividing gauge. Heretofore, the practice has been to determine the correct position of the first blank of a series of gears, which are to be cut, by adjusting this first blank angularly about the axis of the work spindle of the gear cutting machine until the opposite side-cutting edges of the tool or tools are in engagement with opposite sides of a tooth space or of a tooth of the roughed gear blank. The stock dividing gauge is then engaged with a tooth space of the blank and adjusted with reference to a zero point on the work spindle to determine its correct gauging position for other gears of the series to be cut. When another blank of the series is to be cut, the adjusted gauge is set to the zero point and then engaged in a tooth space of the new blank. Automatically, the teeth of the new blank will be correctly positioned angularly with reference to the cutting tool or tools.

A stock dividing gauge has a finger to enter the tooth spaces of the gear blank and gauge the position of the blank. With stock dividing gauges of prior construction, it has been necessary either to use different fingers for gears of different pitches, or to gauge the work from one side of the teeth only, and adjust the work spindle of the gear cutting machine to bring this side of a tooth of each blank against the finger.

One object of the present invention is to provide a stock dividing gauge which can be used just as easily for positioning the first blank of a series of gears to be cut as for positioning any other blank of that series. In other words, one purpose of the invention is to provide a stock-dividing gauge which will eliminate altogether the necessity of using the cutting tool or tools to position the first blank of a series.

A further object of the invention is to provide a stock dividing gauge that will be suitable for use on two-tool straight bevel gear generators of the type shown in my parent application No. 300,025 above referred to, where the tool relieving mechanism is of the ram type and upper and lower tool relieving mechanisms are operated from a single cam, thus rendering impractical to divide stock with the tools, because one tool is out of cutting position when the other tool is in cutting position.

Another object of the invention is to provide a stock dividing gauge which is quite simple in construction but which will be capable of testing gears of any pitch within the range of the gear cutting machine.

A still further object of the invention is to provide a stock dividing gauge which is universal in character and which will be capable not only of testing gears of any pitch, but also of both odd and even tooth numbers.

Still another object of the invention is to provide a stock-dividing gauge for use on precision work which is equipped with means for visually determining when the gauge is in correct gauging position.

Other objects of the invention will be apparent hereinafter from the specification and from the recital of the appended claims.

The invention has been illustrated in connection with a gauge for use on a Gleason Straight tooth bevel gear generator. In such a machine, a pair of planing tools are employed, and the tooth surfaces are generated by reciprocating these tools longitudinally of the tooth surfaces while rotating the work spindle on its axis and simultaneously imparting a rotary movement to a cradle on which either the tools or the work spindle may be mounted. Heretofore, it has been the practice in the case of such a machine to mount the stock dividing gauge on the work spindle, either fixedly or removably. It is this which has necessitated gauging the first blank of a series of gears from the cutting tools. The position of the work spindle of the machine changes during generation, and the tools themselves have had to be used, therefore, as fixed points of reference to gauge the position of the first gear of a series to be cut so that from this gear the stock-dividing gauge itself might be positioned for use in subsequently gauging the position of other gear blanks of the series. The stock dividing mechanism of the present invention is made to be positioned on the work head of the gear cutting machine, with the stock-dividing finger itself centrally disposed with reference to a plane containing the axis of the cradle. Thus, the position of the stock dividing gauge remains fixed with reference to both the work spindle and the cradle (i. e. the tool), and any blank, even the first of a series, can be gauged directly by the stock dividing gauge itself.

The gauging finger of the stock dividing mechanism of the present invention is in the form of a rotary body that has a peripheral tooth-like projection which is of changing thickness from one end to the other. Three different embodiments of the invention are illustrated in the accompanying drawings. In one embodiment, a gauge is provided for gears having odd numbers of teeth. In another embodiment, a gauge is provided for gears having even numbers of teeth. In still a third embodiment, a gauge is provided which is universal in application and which may be employed for dividing the stock of gears having either odd or even numbers of teeth.

The gauge for odd numbers of teeth is in the form of a rotatably adjustable member that has a peripheral tooth-like projection whose sides are of straight profile but lie in helices of opposite hands so that they diverge from one another around the periphery of the gauge.

The gauge for even numbers of teeth is similar to the gauge for odd numbers of teeth except that it is of female form. It has two cooperating tooth-like projections whose adjacent side surfaces are helical surfaces of opposite hand so that they form a tooth space which is adapted to straddle a tooth of the gear blank and whose sides diverge from one another around the periphery of the gauge.

The universal type gauge has two tooth-like helical projections which merge together at one end. Each projection has diverging opposite side surfaces and the hands of the two projections are opposite. The two projections may be engaged either in a tooth space of a roughed gear blank, for positioning a gear blank having an odd number of teeth, or they may straddle a tooth of a roughed gear blank, for positioning a blank that has an even number of teeth.

Each of these different types of gauges is preferably mounted upon the gear cutting machine so that a median line through its tooth-like projection or projections lies in the horizontal plane containing the axis of the cradle of the machine. Hence, when the tooth-like projection or projections is or are engaged with a tooth space or a tooth of a gear blank, the median line of that tooth or tooth space of the blank, which is diametrically opposite the tooth space or tooth, which is engaged by the projection, will lie in the horizontal center plane of the machine and will accordingly be disposed centrally between the two cutting tools. By rotatably adjusting the gauge on its axis, different parts of the tooth-like projection or projections can be brought into operative position to gauge gear blanks of different pitches. For precision work, any of the different embodiments of the invention may be built so that the gauge part is free to float axially, and a dial gauge or other suitable visual indicating means may be provided for determining the axial position of the gauge to insure that it is positioned precisely in the central plane of the machine to position the work accurately.

Figure 10:
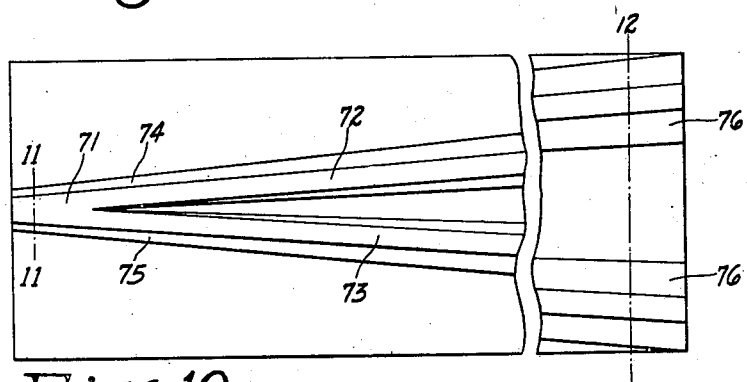
Fig. 10 is a developed view of the stock dividing gauge shown in Figs. 8 and 9.
Figures 11, 12:
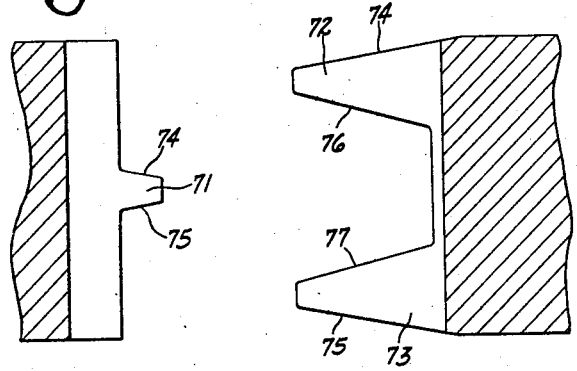
Figure 13:
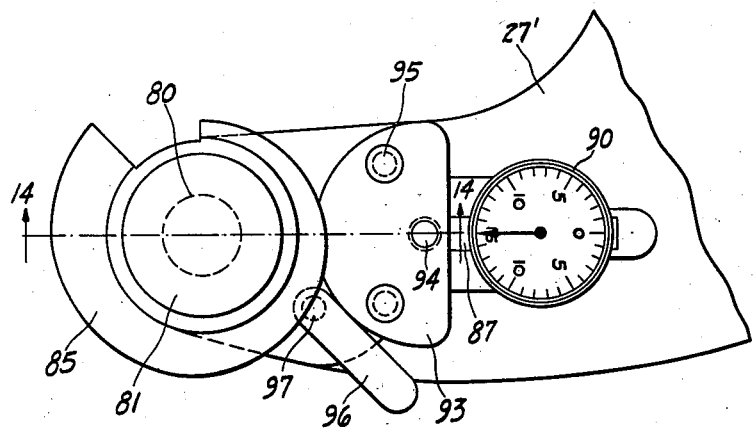
Figures 14, 15:
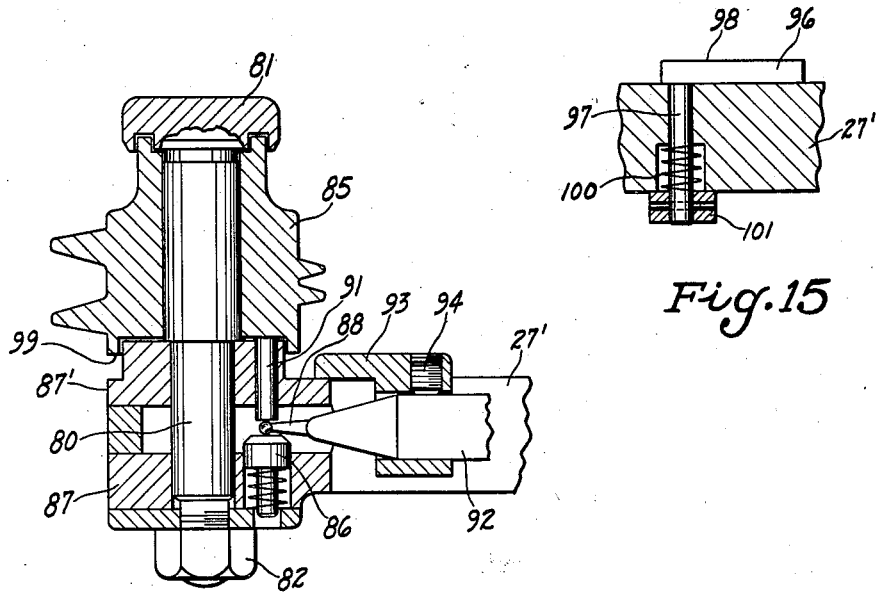

Figs. 11 and 12 are fragmentary sectional views on the lines 11—11 and 12—12 of Fig. 10, respectively;

Fig. 13 is a fragmentary plan view of a stock dividing gauge built according to a still further modification of the invention and equipped with a dial gauge and zeroizing block for insuring that it is precisely positioned for gauging work;

Fig. 14 is a section on the line 14—14 of Fig. 13; and

Fig. 15 is a fragmentary sectional view through the supporting arm of the gauge, showing the way in which the zeroizing block is mounted.

Reference will now be had to the drawings for a more detailed description of the invention.

20 denotes the work head of a gear cutting machine constructed as described in detail in my parent application No. 300,025. Journaled in the work head 20 is the rotary work spindle 21. The gear blank B, which is to be cut, is secured in any suitable manner to the work spindle of the machine while the cutting tools T and T' (Figs. 3 and 5) are suitably mounted on the cradle. The construction and operation of these parts, however, form no part of the invention of the present application.

As already stated, the improved stock dividing mechanism of the present invention may take one of several different embodiments. In each case, however, the stock-dividing gauge proper is carried by a bracket 22 (Figs. 1 and 2) which is mounted for lateral adjustment upon the front face of the work head 20. The bracket 22 has a tongue adapted to engage in an elongated T-slot 23 which is formed in the front face of the work head, and the bracket is secured in any adjusted position on the work head by a T-bolt 24 whose head engages in the slot 23. In the illustrated embodiment of the invention, the median line of the slot 23 extends radially of the axis $x$ of the work spindle of the machine and preferably lies, also, in the horizontal plane containing the axes of the work spindle and of the tool-carrying cradle.

The bracket 22 is formed with integral ears 25, and pivotally mounted upon the bracket by means of a pin or shaft 26 is an arm 27. This arm is keyed to the shaft 26 and carries at its outer end a stud 28 on which is rotatably mounted the stock dividing gauge itself.

Figure 7:
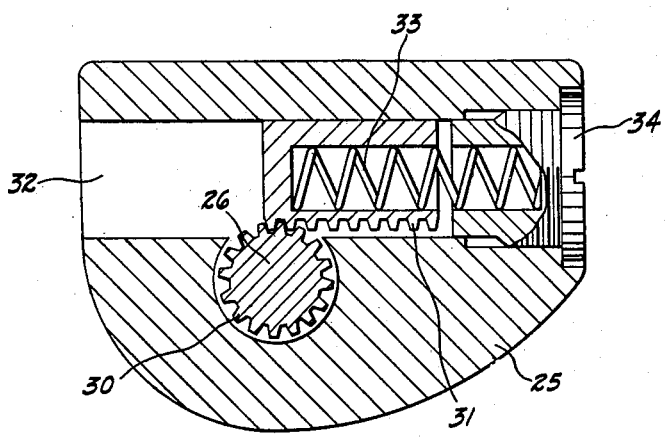
Fig. 7 is a section on the line 7—7 of Fig. 1 but on a much enlarged scale.
Figures 8, 9:
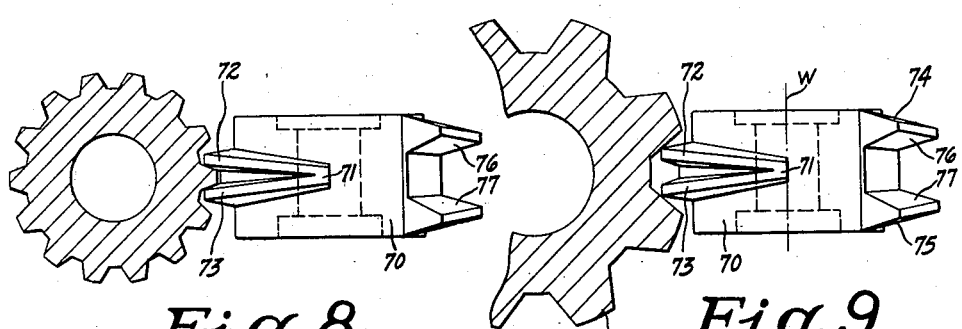
Fig. 8 is a diagrammatic view showing a universal type stock dividing gauge made according to this invention in use for positioning a fine pitch gear having an even number of teeth.
Fig. 9 is a corresponding view illustrating the use of this last form of gauge for positioning a coarse pitch gear having an odd number of teeth.

When a roughed gear blank B has been chucked on the work spindle of the machine, the arm 27 is swung about its pivot 26 to bring the stock dividing gauge into engagement with the blank. When the stock dividing operation has been completed, the arm 27 is swung out of the way so as not to interfere with the cutting operation of the machine. In the illustrated embodiment of the invention, the arm is constantly urged into inoperative position by spring pressure. The shaft 26, which forms the pivot for the arm 27, has spur gear teeth 30 cut around its periphery, as shown in Fig. 7. A rack member 31 meshes with these teeth 30. This rack member is adapted to slide in a hole 32 bored in the lower ear 25 of the bracket 22. A coil spring 33, which is interposed between the rack member 31 and a nipple 34, tends to move the rack member constantly to the left to swing the arm 27 out of operative position. The nipple 34 is threaded into one end of the hole 32, closing the same.

In Figs. 1 to 4 inclusive, I have shown a stock-dividing gauge that may be employed for positioning a roughed gear blank having an odd number of teeth. This gauge is in the form of a rotary body 35 that has a tooth-like projection 36 formed to extend nearly full-way around its periphery. The gauge is so made that the median line of this tooth-like projection lies in the same plane as the median line of the T-slot 23. Thus, the median line of the tooth-like projection 36 will lie in the horizontal plane of the machine. Hence, when the gauge is engaged in a tooth space 37 of a gear blank (Fig. 3), the tooth 38 of the blank, which is diametrically opposite that tooth space, will be correctly positioned for engagement by the cutting tools T and T' of the machine. The median line of this tooth will lie in the horizontal plane of the machine. As each tooth of the gear blank is successively indexed into cutting position, then, it will be in the correct position for cutting, and a finished gear having teeth spaced properly thereon will be produced.

The opposite sides 40 and 41 of the tooth-like projection 36 are helical surfaces of straight profile but of opposite hand so that they diverge from one another from one end 42 of the projection to the other end 43 thereof. Thus, the thickness of the projection 36 increases around the periphery of the body 35. Hence, by rotatably adjusting the gauge 35 on its pivot stud 28, different parts of the tooth-like projection 36 may be brought into operative position to engage a roughed gear.

Figures 3, 4:
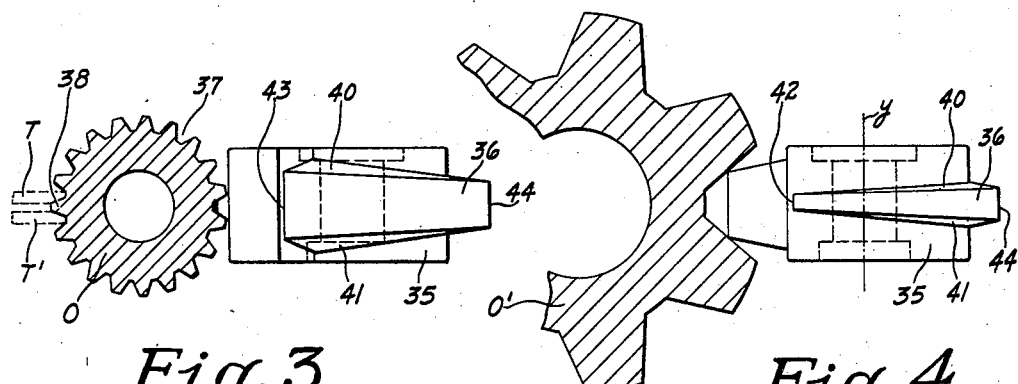
Fig. 3 is a diagrammatic view illustrating the use of the stock dividing gauge for locating a gear of a given pitch having an odd number of teeth.
Fig. 4 is a diagrammatic view showing how the same gauge may be used for positioning a gear of much larger pitch but which has also an odd number of teeth.

Any gear, regardless of its pitch, which has an odd number of teeth and which comes within the cutting range of the machine, may be located by the gauge 35. Thus, as diagrammatically illustrated in Fig. 3, the gauge 35 may be employed for positioning a gear blank O of fine pitch, having a small number of teeth, by rotatably adjusting the gauge 35 to bring a portion of the tooth-like projection 36 of proper thickness into operative position, and then swinging the arm 27 to engage this portion of the gauge in a tooth space of the blank. In Fig. 4, the gauge is shown in use for positioning a gear O' having an odd number of teeth but of considerably coarser pitch than the gear O. This gauge has been rotatably adjusted to bring a portion of the tooth-like projection 36 of appropriate thickness into position to engage in a tooth space of the gear.

In the embodiment of the invention shown in Figs. 3 and 4, the top surface 44 of the tooth-like projection 36 is concentric with the axis $y$ of the body 35, but the body itself is turned down eccentric of this axis so that the height of the tooth-like projection will vary around the periphery of the body increasing from the small end 42 to the large end 43 thereof. This is for convenience in gauging gears of different pitches at the pitch line thereof or at any other suitable depth.

The peripheral distance between the end 43 of the tooth-like projection 36 and the beginning of the same is slightly greater than the face width of any gear that may be cut on the machine so that either extremity of the tooth-like projection may be employed to gauge a gear without danger that the other extremity will interfere with the gauging operation.

Figures 5, 6:
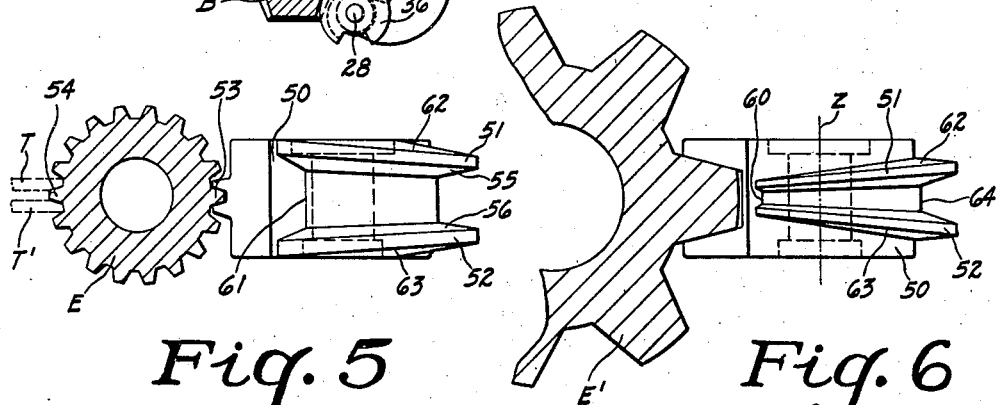
Fig. 5 is a diagrammatic view illustrating the use of a gauge made according to the present invention for positioning a gear blank of fine pitch having an even number of teeth.
Fig. 6 is a view showing how this form of stock dividing gauge may be used for positioning a gear of much coarser pitch but having also an even number of teeth.

Figs. 5 and 6 show a modified form of gauge for positioning gears having even numbers of teeth. This gauge comprises a rotary body 50 having two tooth-like projections 51 and 52 formed thereon that bound a tooth space which is adapted to straddle a tooth of the gear blank to be gauged. The median line of this space by construction lies in the horizontal central plane of the machine so that when the gauge is engaged with a tooth 53 of a roughed gear blank E, as shown in Fig. 5, the tooth 54 of the blank, which is diametrically opposite the tooth 53, will be correctly positioned for cutting by the tools T and T'. The adjacent side surfaces 55 and 56 of the tooth-like projections 51 and 52 are of opposite hand so that they diverge from one another from one end 60 of the gauge member to the other end 61 thereof. Thus the space between the two tooth-like projections is of increasing width from the end 60 to the end 61 of the gauge. To allow for the stock, which has to be removed from the roughed gear blank in the finish cutting operation, the width of the space at the starting end 60 is slightly larger than the thickness of a tooth of the finest pitch gear which may be cut on a machine, and the width of the space at the large end 61 is made slightly greater than the thickness of a tooth of the coarsest pitch gear which may be cut on the machine. Thus the gauge will handle any roughed gear which is to be finish-cut.

The outsides 62 and 63 of the tooth-like projections 51 and 52, respectively, may be made of any suitable shape. They may conveniently be turned to the same leads as the active inner sides 55 and 56, respectively.

Fig. 5 shows the gauge adjusted to locate with reference to the cutting tools T and T' a gear blank E having an even number of teeth but a fine pitch. Fig. 6 shows the same gauge rotatably adjusted so that a wider portion of the space between the tooth-like projections 51 and 52 is in operative position to engage a gear blank E' of considerably coarser pitch. The tops of the tooth-like projections 51 and 52 are turned concentric of the axis $z$ of the gauge member, but the land 64 between these tooth-like projections is turned eccentric of this axis. The tooth-like projections, themselves, then, increase in height around the periphery of the gauge for convenient use in gauging gear blanks of different pitches at approximately the pitch line of the teeth of such blanks.

In Figs. 8 to 12 inclusive I have illustrated a still further modification of the invention in the form of a universal type gauge. This gauge may be employed for positioning any gear, which is within the cutting range of the machine, whether it has an odd or an even number of teeth and regardless of its pitch.

This gauge has a body portion 70 on which is formed a projection which begins at one end as a single tooth-like projection 71 and is then bifurcated to form two tooth-like projections 72 and 73. The opposite sides 74 and 75 of the projection 71, which subsequently form the outside surfaces of the projections 72 and 73, are helical surfaces of straight profile and uniform lead but of opposite hand. The outside surfaces 74 and 75 bound a tooth-like member which may be employed in locating gears, such as the gear O" shown in Fig. 9, which have an odd number of teeth. By rotating the gauge on its axis $w$, different portions of the tooth-like member bounded by the sides 74 and 75 may be engaged in a tooth space of a roughed gear blank in accordance with the pitch of the gear blank, to locate the gear blank properly relative to the cutting tools.

At a suitable convenient point around the periphery of the gauge, the tooth-like projection 71, as already stated, is bifurcated. The inside surfaces 76 and 77 of the furcations are helical surfaces of straight profile of uniform lead but of opposite hand. The furcations form a space of increasing width for straddling a tooth of a roughed gear blank to position a gear, such as the gear E" shown in Fig. 8, which has an even number of teeth, into proper relation to the cutting tools.

The width of the space between the furcations at their small end is, as in the case of the gauge shown in Figs. 5 and 6, equal to the width of a tooth of a finished gear of the finest pitch, which it is practicable to cut on the machine, plus the necessary allowance for stock to be removed from the opposite sides of the teeth of the roughed gear blank in order to produce the desired finished size of tooth. Likewise, the width of the tooth-like projection 71 at its smallest end, is, as in the case of the gauge shown in Figs. 3 and 4, equal to the width of a tooth space of a gear of the finest pitch, which can be cut on the machine, less an allowance for the amount of stock to be removed from the opposite sides of the tooth spaces of the gear blank in the finish-cutting operation.

Since the width of the space between the furcations 72 and 73 is determined by the pitch of a gear plus the allowance for stock to be removed in the finshing operation, and since the width of the tooth-like projection formed by the sides 74 and 75 is equal to the width of a tooth space of the gear less the allowance for stock to be removed in the finish-cutting operation, it will be obvious that the leads of the sides 76 and 77 will be different, respectively, from the leads of the sides 74 and 75 of those projections. The tooth-like projections extend around the periphery of the gauge 70 for a distance sufficient to provide an intervening space of sufficient width to allow the gauging of a gear having an odd number of teeth of the greatest pitch that can be cut upon the machine. Since the point, at which a space of sufficient width is provided to gauge a gear having an odd number of teeth, is angularly removed from the point of beginning of the tooth-like projection 71 it will be obvious that the outside surfaces 74 and 75 extend for a distance greater than is required to gauge a gear of an even number of teeth of the largest pitch that can be cut upon the machine.

For very precise work, as has already been indicated, any of the gauges made according to my invention may be equipped with supplemental means for locating the gauging finger precisely in the central plane of the gear cutting machine. A gauge so equipped is shown in Figs. 13 to 15 inclusive.

Figure 1:
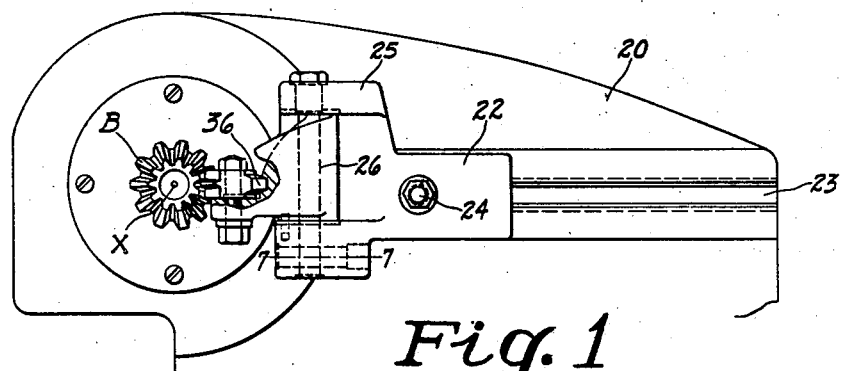
Fig. 1 is a fragmentary view looking at the front end of the work head of a straight tooth bevel gear generator, such as described in more detail in my prior application No. 300,025 above mentioned, and showing a stock dividing gauge constructed according to one embodiment of the present invention in use for positioning a roughed bevel gear blank on the machine.
Figure 2:
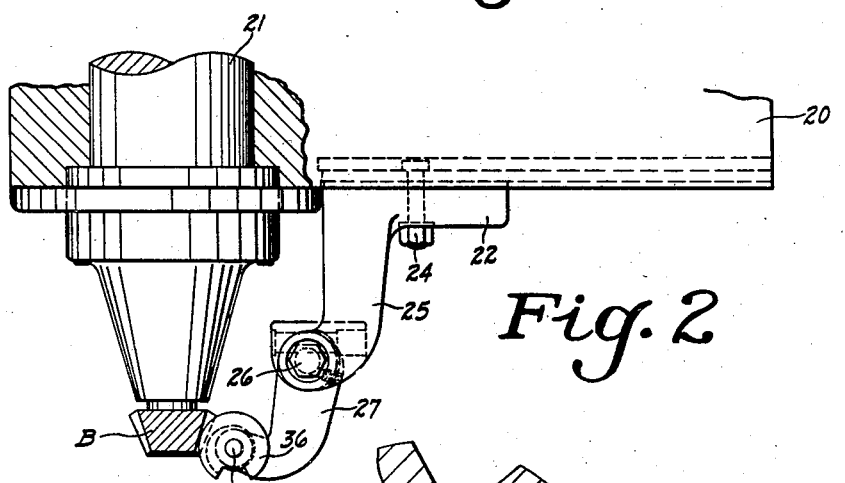
Fig. 2 is a plan view of the parts shown in Fig. 1.

Here, 27' denotes an arm similar to the arm 27 of Figs. 1 and 2. The outer end of this arm is bifurcated and mounted in the furcations is a stud 80 that is formed at one end with an enlarged head 81 and that is held in the arm by a nut 82 which threads onto its opposite end.

The stock-dividing member 85 proper, which may be made according to any of the previously described embodiments of the invention or according to any other modification thereof, is rotatably mounted on the stud 80 so as to be free to float axially of the stud. The gauge member 85 is normally pressed axially in one direction by a spring-pressed plunger 86 which is mounted in one furcation 87 of the arm 27'. The pressure of this plunger is transmitted to the gauge member 85 through the medium of the finger 88 of a dial gauge 90, and of a pin 91. The pin 91 is slidably mounted in the other furcation 87' of the arm 27'. The finger 88 contacts at one side with the plunger 86 and at its opposite side with one end of the pin 91. The pin 91 contacts at its opposite end with one end face of the gauge member 85.

The dial gauge 90 may be of any usual or suitable construction. The arm 27' is slotted to receive the stem 92 of this dial gauge and the dial gauge is removably secured to the arm by a holder 93. A set-screw 94, that engages the stem 92 of the dial gauge, serves to secure the dial gauge in the holder, and screws 95, that thread into the arm, serve to fasten the holder to the arm.

Pivotally mounted on the arm 27' is a positioning or zeroizing block 96. This block is secured to one end of the pivot pin 97. The block 96 is precisely ground so that its outer face 98 will be at a predetermined distance from the medial line of the slot 23 of the work head 20, that is, at a predetermined distance from the central plane of the machine. This distance is made such that, when the arm is swung from its inoperative position, shown in Fig. 13, to operative position where it will engage the end face 99 of the gauge member 85, then the median line of the tooth-like projection or projections of the gauge-member 85 will be in the central plane of the machine.

When the block 96 is thus engaged with the end face 99 of the gauge member, the dial gauge 90 may be set at zero. The block member 96 is then swung back out of the way to the inoperative position shown in Fig. 13. Thereafter, when the tooth-like projection or projections of the gauge member 85 are being used to divide stock of a roughed gear blank, it can be determined by simply reading the dial gauge 90 whether or not the median line of the tooth-like projection or projections of the gauge member 85 is in the central plane of the machine, and thus whether or not the stock-dividing operation is being performed precisely.

A coil spring 100, that surrounds the pin 97 and that engages the enlarged head 101 of the pin, serves to hold the zeroizing block 98 frictionally in either operative or inoperative position.

In use of the gauges made according to any of the embodiments of this invention, after the roughed gear blank, which is to be cut, has been placed upon the work spindle of the gear cutting machine, the stock dividing gauge is swung over to position the blank on the machine. The gauge will locate the roughed gear blank so that the tooth or tooth space opposite that engaged by the gauge, depending upon whether the gear has an even or an odd number of teeth, will be correctly positioned between the cutting tools with its median line lying in the horizontal plane of the machine.

Although the invention has been described particularly for use on a two tool generator for cutting straight bevel gears it will be understood that gauges made according to this invention may be employed on other types of machines, also, for locating other types of gears. It will further be understood that while the invention has been described in connection with certain particular embodiments thereof, it is capable of still further modifications. This application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A stock dividing gauge for gears comprising a support and a body member which is rotatably adjustable on said support and which has a tooth-like projection formed on its periphery that is of different thicknesses at different points around said periphery.

2. A stock dividing gauge for gears comprising a support, and a body member which is rotatably adjustable on said support and which has a tooth-like projection formed on its periphery that is of progressively increasing thickness.

3. A stock dividing gauge for gears comprising a support, and a body member which is rotatably adjustable on said support and which has a tooth-like projection formed on its periphery, the opposite sides of which are of straight profile and are helical surfaces of uniform lead but of opposite hand.

4. A stock dividing gauge for gears comprising a support, and a body member which is rotatably adjustable on said support and which has a pair of tooth-like projections formed on its periphery, the adjacent sides of which are helical surfaces of uniform lead but opposite hand, to bound a space of progressively increasing width so that the gauge may be adjusted to test teeth of different pitches.

5. A stock dividing gauge for gears comprising a support, and a body member which is rotatably adjustable on said support and which has a bifurcated tooth-like projection formed on its periphery, the internal adjacent sides of its furcations being helical surfaces of uniform lead but opposite hand, and the external sides of said furcations being also helical surfaces of uniform lead and opposite hand but of different lead from the internal surfaces.

6. In a machine for generating gears, the combination with a support, of a bracket mounted on said support to have a fixed relationship to the tool mechanism of said machine, and a stock dividing gauge mounted on said bracket comprising a body which is rotatably adjustable on said bracket and which has a tooth-like projection formed on its periphery that is of progressively increasing thickness so that it may be adjusted to gauge gears of different pitches.

7. In a machine for generating gears, the combination with a support, of a bracket mounted on said support to have a fixed relationship to the tool mechanism of the machine, and a stock dividing gauge mounted on said bracket comprising a body which is rotatably adjustable on said bracket and which has a tooth-like projection formed on its periphery, the sides of which are helical surfaces of uniform lead but opposite hand.

8. In a machine for generating gears, the combination with a support, of a bracket mounted on said support to have a fixed relationship to the tool mechanism of the machine, and a stock dividing gauge mounted on said bracket comprising a body which is rotatably adjustable on said bracket and which has a pair of tooth-like projections formed on its periphery, the adjacent sides of which are helical surfaces of uniform lead but opposite hand, so as to bound a space of progressively increasing width which is adapted to be engaged with a tooth of a roughed gear blank to locate the blank in proper position on the machine.

9. In a machine for generating gears, the combination with a support, of a bracket mounted on said support to have a fixed relationship to the tool mechanism of the machine, and a stock dividing gauge mounted on said bracket comprising a body which is rotatably adjustable on said bracket and which has a bifurcated tooth-like projection formed on its periphery, the internal adjacent sides of the furcations being helical surfaces of uniform lead but opposite hand, and the external sides of said furcations being also helical surfaces of uniform lead and opposite hand, but being of different lead from the internal surfaces.

10. A stock dividing gauge for gears comprising a support, a body member which is rotatably and axially movable on said support and which has a tooth-like projection formed on its periphery, and means for visually indicating the axial position of said tooth-like projection.

11. In a machine for generating gears, the combination with a locating part having a fixed relationship to the tool mechanism of the machine, of a bracket removably mounted on said locating part, said bracket and locating part having inter-engaging portions for locating the bracket on the locating part, a stock dividing member movably mounted on said bracket and having a tooth-like projection formed thereon that is adapted to be engaged with opposite side tooth surfaces of a gear, a positioning member movably mounted on said bracket and adapted to be engaged with the stock-dividing member to position said stock-dividing member in predetermined relationship to the locating part of the machine, and means for visually indicating the position of said stock-dividing member relative to said locating part.

12. In a machine for producing gears, the combination with a locating part having a fixed relationship to the tool mechanism of the machine, of a bracket removably mounted on said locating part, a stock dividing member mounted on said bracket for axial and rotatable movement thereon, said stock-dividing member having a tooth-like projection formed on its periphery that is of progressively increasing thickness so that it may be adjusted to gauge gears of different pitches, a zeroizing member mounted on said bracket and having a surface which is at a predetermined precise distance from said locating part and which is engageable with said stock-dividing member to position said stock-dividing member in precise axial relationship to said locating part, and means for visually indicating the axial position of said stock-dividing member.

13. A stock dividing gauge for gears comprising a support, and a tooth-engaging member which has opposite side surfaces that are spaced different distances apart at different points along the length of said member, said tooth engaging member being mounted on said support for adjustment so that it may be engaged selectively at different points along its length with opposite side tooth surfaces of a gear to gage gears of different pitches.

14. A stock dividing gauge for gears comprising a support, and a tooth-engaging member which has opposite side surfaces that diverge from one another along the length of said tooth-engaging portion, said tooth-engaging member being mounted on said support for adjustment so that it may be engaged selectively at different points along its length with opposite side tooth surfaces of a gear to gauge gears of different pitches.

15. A stock dividing gauge for gears comprising a support, and a tooth-engaging member which is rotatably adjustable on said support, said engaging member having a tooth-like projection which has helical side surfaces, so that by adjustment of said member on said support, said member may be engaged at different points along its length with a gear tooth to gauge gears of different pitches.

16. A stock dividing gauge for gears comprising a support, and a tooth-engaging member which is rotatably adjustable on said support, said engaging member having opposite side surfaces that are helical surfaces of uniform lead but opposite hand and that diverge from one another circumferentially of said member so that said member may be adjusted on said support to engage at different points around its circumference with opposite side tooth surfaces of a gear to gauge gears of different pitches.

LEONARD O. CARLSEN.